Feb. 27, 1923.                                                    1,446,759
              H. MERCIER
         STABILIZING DEVICE FOR VEHICLES
           Filed Aug. 1, 1921         4 sheets-sheet 1

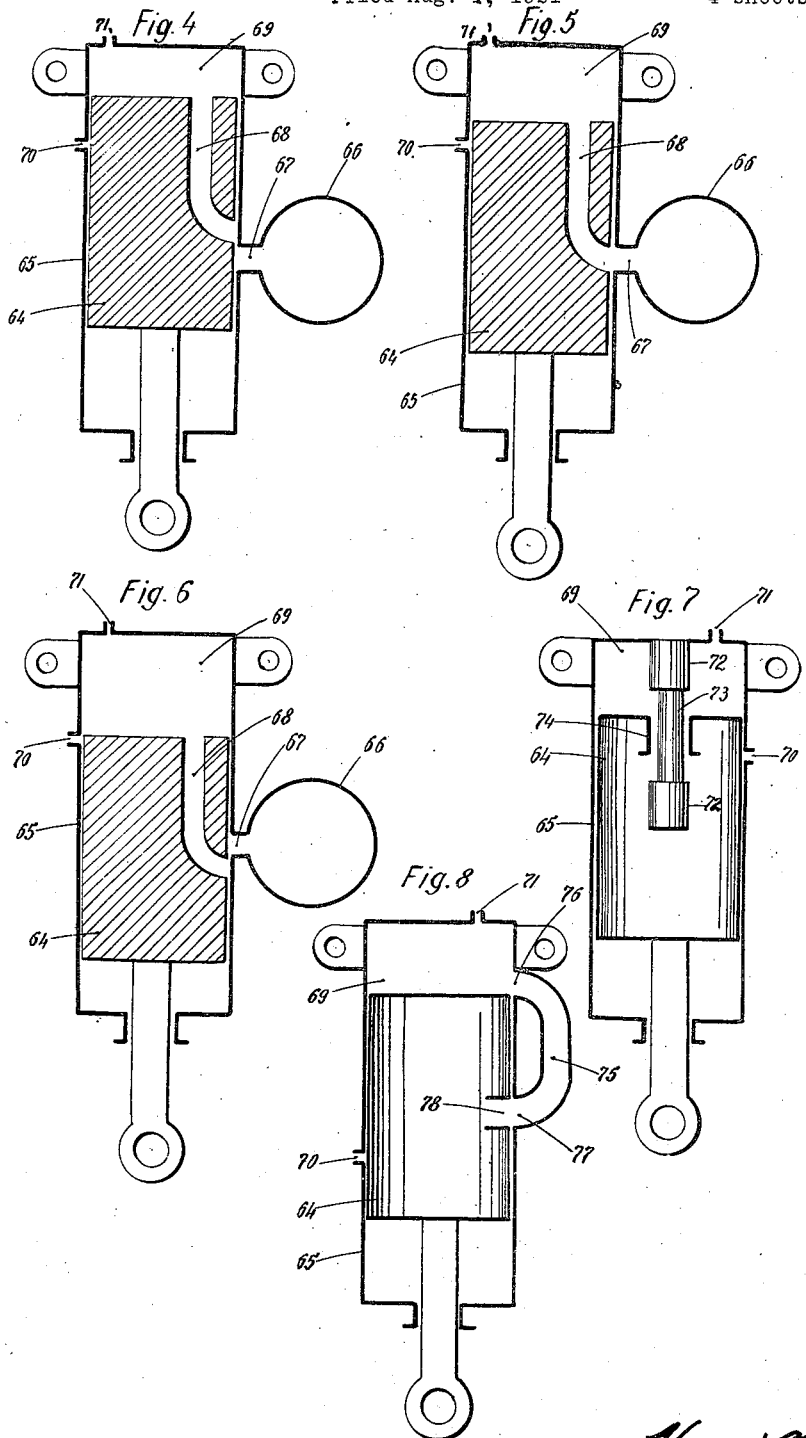

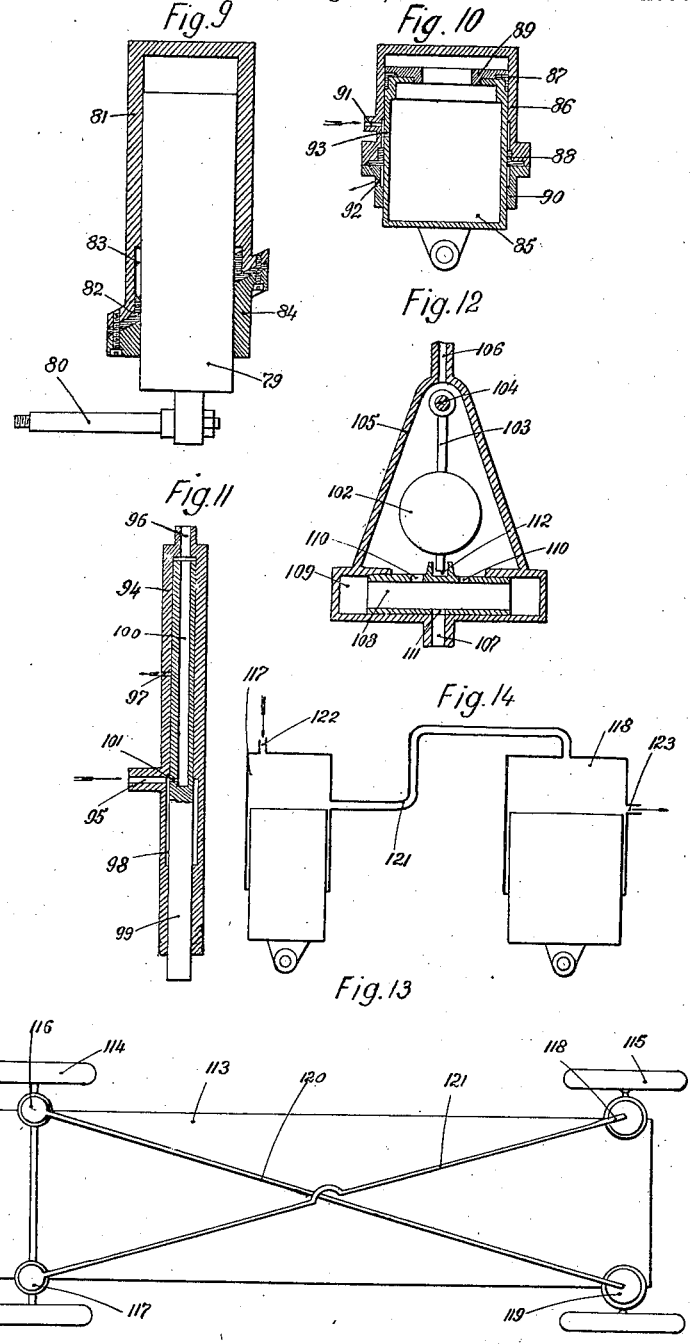

Patented Feb. 27, 1923.

1,446,759

UNITED STATES PATENT OFFICE.

HENRI MERCIER, OF PARIS, FRANCE.

STABILIZING DEVICE FOR VEHICLES.

Application filed August 1, 1921. Serial No. 489,016.

(GRANTED UNDER THE PROVISIONS OF THE ACT OF MARCH 3, 1921, 41 STAT. L., 1313.)

*To all whom it may concern:*

Be it known that I, HENRI MERCIER, citizen of the French Republic, residing at Paris, Department of the Seine, in France, and having P. O. address 6 Rue Foucault, in the said city, have invented certain new and useful Improvements in or Relating to Stabilizing Devices for Vehicles (for which I have obtained patents in the following countries: Spain, No. 78,411, June 1, 1921; Great Britain, No. 164,333, June 2, 1921; No. 164,337, June 4, 1921; No. 164,340, June 6, 1921; France, No. 516,635, June 2, 1920; and certificate of addition No. 23,113, June 7, 1920); and I do hereby declare the following to be a full, clear, and exact description of the invention, such as will enable others skilled in the art to which it appertains, to make and use the same.

This invention relates to stabilizing devices for vehicles, and more particularly for motor vehicles in which pneumatic suspensions are used; said devices including improvements to said suspension.

The invention is more particularly described with reference to the accompanying Figures, 1 to 14 which show how the invention is carried into effect for all the devices.

Figures 4 to 6 show by way of example, a construction according to the invention for three different positions of pneumatic pistons.

Figures 7 and 8 are modified constructions of the above applicable to the case of a suspension worked with a regulating leak.

Figure 9 is a view, partly in section, of the cylinder and of the piston of a pneumatic suspension provided with leather packing of a special shape intended to reduce the effects of friction of the piston on the cylinder.

Figure 10 is a section of a compressed air distribution without valve, avoiding losses of oil.

Figure 11 is a section of a removable distribution avoiding losses of oil and capable of being combined with pneumatic and metallic suspensions.

Figure 12 is a section of an automatic closing device for the shock absorbing chamber of pneumatic suspensions, and Figures 13 and 14 are diagrams of coupling of pneumatic suspensions which reduce the rolling and economize compressed air.

It is owing to the special method of mounting the suspension members on motor car chassis that the rolling effects are obviated, the said method of mounting or erecting resulting in moving suspensions to points outside the space occupied by the chassis.

Figure 1:
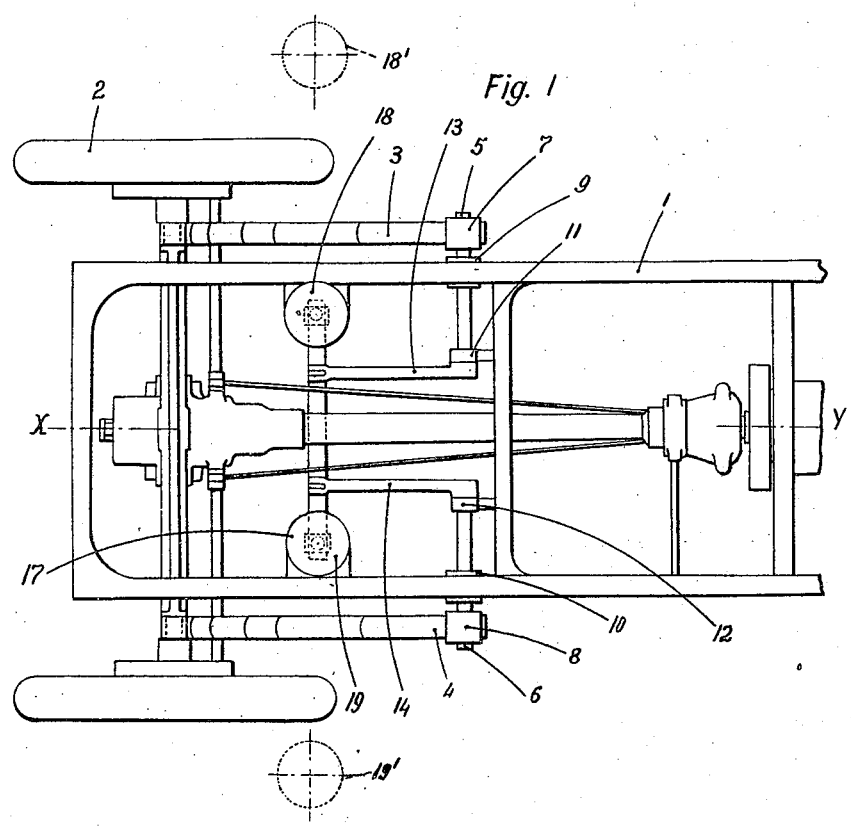
Figure 1 shows in plan a chassis of a standard type of motor car, with a suspension device according to this invention.
Figure 2:
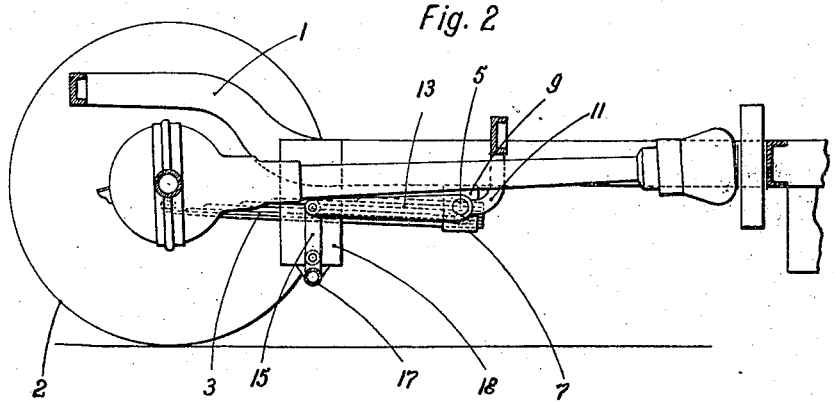
Figure 2 is a longitudinal section of the same chassis.
Figure 3:
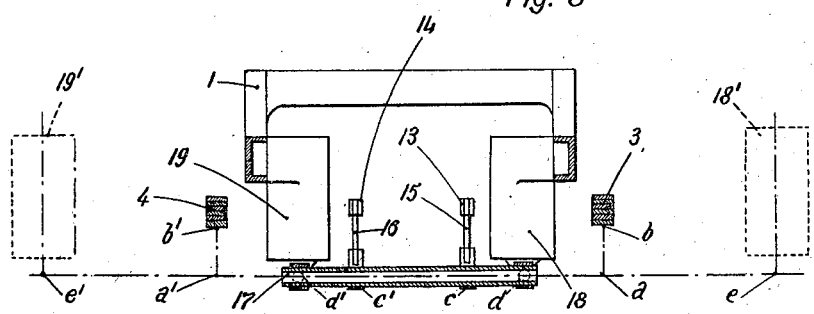
Figure 3 is a cross-section through the axis of the suspensions.

In the Figures 1, 2 and 3, the chassis 1 and the wheels 2 are connected by the springs 3—4, secured to the chassis by the pins are shown at 5—6. These pins are secured to shackles 7 and 8 in which are mounted the springs. The pins 5 and 6 are pivoted in brackets 9 and 10 and 11 and 12, Figures 1 and 2.

13 and 14 are levers keyed respectively to the pins 5 and 6, and connected by rods 15 and 16 which are loosely mounted in suitable shackles to a beam 17.

The pneumatic suspensions according to the invention are shown at 18 and 19. The pistons of the pneumatic suspensions rest on the ends of the beam 17 at $d$—$d^1$, of Figure 3.

The working will be readily understood, from the following:

During vertical movements of the chassis, parallel to itself, the pistons of the pneumatic suspensions are operated in the same direction and to an absolutely identical extent, as if the beam 17 deprived of its system of connecting rods and levers and attached at $d$ $d^1$ Figure 3, at the pistons, were extended to $a$—$a^1$, and at these points connected by suitable connecting rods to the points $b$—$b^1$ of the springs 3 and 4.

Such a system of connection, which is correct as regards parallel movements, would aggravate the effects of rolling, the nearer the pivots $d$—$d^1$ which are situated between the points $a$—$a^1$, are located to the axial plane X—Y of the chassis. It is true that one could provide pneumatic suspensions arranged outside the chassis and mounted on suitable supports; the points $d$—$d^1$ being then situated outside at the points $a$—$a^1$ and the rolling thereby reduced. This arrangement is already known and is effective, but it is difficult to apply owing to the resulting overall dimensions.

According to this invention the rolling is reduced as much as may be desired without any drawbacks from the point of view of the arrangement of the suspensions on the chassis and of the overall dimensions of the latter. The movements of the points $b—b^1$ are transmitted to the points $c—c^1$ lying between the pivots $d—d^1$, at either side of the axial plane X—Y. From the point of view of vertical parallel movements of the chassis, the working is exactly the same as that described above. From the point of view of movements during the rolling, everything takes place as if the beam 17 were extended to $e—e^1$ resting on virtual suspensions $18^1—19^1$ (secured to the chassis 1 and identical with the real suspensions 18 and 19), and connected at $a—a^1$ to the points $b—b^1$ of the springs 3 and 4, so that in the virtual system, the proportion between the distances $e—e^1$ to $a$, $a^1$ are equal to the proportion $d—d^1$ to $c—c^1$ in the real system.

The pneumatic suspension of vehicles or the like in which there exists great resiliency are already known. In such suspension for the purpose of reducing the shocks at the end of the stroke, the resiliency is quickly reduced at a certain moment by the provision of one or more auxiliary chambers communicating with the casing by movable walls of the shock absorber, in such a manner that the opening and the closing of the communication or communications depend on the movements of the shock absorber.

These arrangements though they are adapted to avoid shocks at the end of the stroke, cannot prevent the rolling movements of the vehicle, due to an excessive elasticity of the suspensions during the expansion; when they are applied to suspensions worked with a regulating leak, they involve moreover an excessive consumption of compressed air.

The present invention renders it possible to avoid the said drawback and greatly reduce the rolling of vehicles.

The invention consists in opening or closing twice, instead of once, during the stroke of the piston, the orifices through which the auxiliary chamber or chambers communicate with the casing through movable walls, and in bringing into operation the regulating leak only after the auxiliary chamber or chambers have been closed.

The accompanying figures show by way of example, a construction according to this invention, for three different positions of the piston (Figures 4–6) and two modified constructions (Figures 7 and 8), applicable to the case of a suspension worked with a regulating leak.

In the construction shown in Figures 4–6, 64 is the piston, 65 the cylinder, 66 an auxiliary chamber opening at 67 into the cylinder, through a conduit 68 provided in the piston and adapted to establish communication between the chamber 66 and the upper space 69 of the cylinder, 70 the regulating leak, and 71 the inlet supply of fluid to the cylinder.

In Figure 4, the chamber 66 is not in communication with the space 69 of the cylinder which alone operates for ensuring a reduced elasticity.

On the piston descending (Figure 5) the space 69 is in connection through the conduits 68 and 67, with the chamber 66. The two chambers 69 and 66 become therefore operative, and ensure a maximum resiliency. This position of Figure 5 corresponds to the mean position of the piston during the normal working of the suspension.

If the piston continues to descend (Figure 6), the chamber 66 ceases to be in communication with the chamber 69 which alone remains operative in order to reduce the resiliency to an acceptable value, such as to prevent injurious rolling from taking place owing to an excessive facility given to the piston during expansion. At the same time, the regulating leak 70, which up to that moment remained closed, is uncovered and produces a rapid fall in pressure.

In the modified construction shown in Figures 7 and 8, the auxiliary chamber is constituted by the piston 64 itself which is made hollow for that purpose. In the modified construction in Figure 7, the piston slides along a fixed guide 72, having enlarged ends 73. The upper orifice 74 of the piston is closed, and the communication between the chamber 69 and the inner chamber of the piston interrupted when it slides along the guide 72 of greater diameter, whilst on the contrary it establishes communication between the chamber 69 and the inner chamber of the piston when the latter slides along the guide 73 of smaller diameter.

In the modified construction in Figure 8, a conduit 75 opening at two points 76 and 77 at different levels into the cylinder 62, enables communication to be established between the chamber 69 and the inner chamber of the piston as soon as the orifice 78 provided in the piston, comes opposite the orifice 77.

The devices shown in figures from 9 to 14 relate to improvements in or modifications to known devices which improvements make it possible, even in certain cases, to reduce the effects of the rolling to which are subject to pneumatic suspensions whether they be combined or not with metallic springs.

With reference to Figure 9, the device illustrated is built for the following purpose; when the pneumatic suspension is exposed to a stress such as for instance that due to an overhanging journal mounted direct on the piston, capable of turning or not for the purposes of steering, a particular equilibrium of the said piston renders it possible to reduce or to cancel the injurious effects of friction of the piston on its cylinder.

In Figure 9, 79 is the piston of the pneumatic suspensions, 80 the journal to which it is secured, 81 the cylinder of the suspension secured to the chassis, 82 a leather packing or any other suitable packing arranged obliquely relatively to the axis of the cylinder, and of an elliptical shape. This packing which may be secured to the piston and slide in the cylinder, is held in place by a cap 84 secured by pins.

When the pressure of the compressed air acts in the unsymmetrical chamber 83, it follows that the piston is pushed against the wall of the cylinder and of the cap 84, towards the right in the figure. On the other hand, the load on the journal or overhang tends to exercise a contrary pressure (towards the left) on the cylinder and the cap. These two thrusts cancel each other in such a manner that the piston escaping from the injurious influence of the friction, may work perfectly by sliding or by turning about itself. Owing to this, the suspension becomes a pivoted member for steering.

In the device shown in Figure 10 which renders possible to use compressed air distribution without a valve and which avoids losses of oil, the hollow piston is shown at 85 and the cylinder secured to the chassis at 86. Two packings 87 and 88 act in the opposite direction on the pressure of the air; 89 and 90 are the caps holding in place the said packings; 91 is the feed orifice, 92 the regulating leak and 93 an air outlet provided in the hollow piston 85.

The working is as follows: when compressed air is admitted through 91, it passes through the air outlet 93 into the hollow piston and the cylinder. Under the action of the pressure, the piston 85 descends relatively to the cylinder 86; in the said movement the outlet 93 is first closed by the packing 88. At this moment the pressure acting in the interior of the hollow piston, which pressure acts through the outlet 93 on the inner face of the packing, cannot make it open out, given the higher feed pressure acting on the outer face of the said packing. No leakage of air or oil can therefore occur owing to the passage of the outlet 93 in front of the packing 88. The movement continuing, the outlet 93 descends below the packing, and the regulating leak 92 becomes operative.

In the device shown in Figure 11, the removable distribution shown avoids losses of oil and can in combination with pneumatic and metallic suspensions compensate the bending of the metal springs.

It comprises at 94 a cylindrical casing provided with two branches and one leakage hole. The feed air branch is inlet shown at 95, and that shown at 96 is communication with the upper space of the cylinder of the suspensions, the regulating leak is shown at 97. A space 98 is provided in the bore of the casing 94 (which space may be replaced by a helical groove), a piston 99 is fitted with a slight amount of friction into the casing 94; owing to the accurate fitting of the parts 94 and 99, an air tight joint could be ensured without it being absolutely necessary to use packing devices. The piston 99 comprises a perforated conduit 100 and an inlet 101 provided at the base of the said conduit. The casing 94 is secured to the chassis of the car, the piston 99 resting freely either on a part secured to the piston of the suspension or on the axle itself.

The working of the device is as follows:

The compressed air for feeding the suspension is admitted at 95, it fills the space 98 and through the inlet 101 and the conduit 100 passes into the branch 96 and thus into the suspension; the latter become operative and raises the car relatively to the axle. The piston 99 resting on the axle, follows the latter in its movement, under the influence of the pressure of air exercised on it. In continuing its travel, a moment will arrive when the inlet 101 will have passed beyond the bottom of the chamber 98 and be closed. Beginning with that moment, the admission of compressed air into the suspension will cease, and the suspension as well as the piston 99 will stop. If for any reason the suspension expanded further, the piston 99 still remaining in contact with the axle, would descend at the same time as the latter until its upper part uncovers the regulating leak 97; the escape of air thus takes place from the upper part of the suspension where oil is scarce and cannot be carried away through the branch 96 and the leak 97. On the other hand, regulation of the position of the chassis relatively to the axle always takes place correctly, whatever be the permanent bends assumed by the metal springs under the action of badly distributed loads.

The device shown in Figure 12 renders it possible, in pneumatic suspensions of the type referred to, to reduce the rolling by the closing of the shock absorbing chamber at the very moment when the centrifugal force makes its influence felt. The device comprises the following parts:

A pendulum 102 is suspended by a rod 103 to a spindle 104 secured to an air tight casing 105 of suitable shape. This casing comprises an upper branch 106 in communication with the chamber, and a bottom branch 107 in communication with the suspension. A balanced valve 108 slides with a slight amount of friction in a suitable seat 109 of the casing 105. This slide valve is in communication through ports 110 with the chamber and through the port 111 with the suspension. The bottom part of the suspension rod of the pendulum penetrates freely into a recess of a boss 112 provided in the upper part of the slide valve 108.

The whole is arranged on the chassis of the vehicle in such a manner that under the action of the centrifugal force tending to produce the rolling, the pendulum by its movement should move the slide valve 108 either to the right or to the left. In one case as in the other, the port 111 of the valve 108 ceases to coincide with the branch 107, and communication between the suspension and the shock absorbing chamber being thus broken, the coefficient of elasticity of the pneumatic suspension is increased, and the rolling reduced accordingly. As soon as the action of centrifugal force ceases, and the pendulum resumes its vertical position of equilibrium, the suspension resumes its full resiliency and the communication is reestablished.

Figures 13 and 14 are coupling diagrams of pneumatic suspensions, the object of which is to reduce the rolling by utilizing for the purpose the escape of compressed air through the regulating leak of the suspension during the expansion period; the device renders it also possible as will be seen, to economize compressed air.

In Figure 13, the chassis is shown at 113, the rear wheels at 114 and the front wheels at 115; the rear pneumatic suspensions are shown at 116—117 and the front ones at 118—119. The suspensions 116—119 are connected together by a conduit 120 and the suspensions 117—118 by a similar conduit 121.

The suspensions, shown in Figure 14, are supplied at the back through a branch 122, and the front suspensions are provided with an orifice for the escape into the atmosphere, shown at 123.

The dimensions of the parts and the loads are such that the pressure in the rear suspensions is always greater than that in the front suspensions, it follows therefrom that the compressed air escaping from the rear suspensions, is used for working the front suspensions in expanding, which effects a saving of fluid and renders possible a reduction in the rolling, as already stated.

This result can be explained as follows: when the rolling acts on the whole, the rear suspension during the expansion period exhausts through the orifice of the conduit 121, Figure 14, for instance uncovered by the corresponding piston of the suspension, the compressed fluid passes then diagonally through the conduit 121 into the front suspension in the period of compression, feeds it and returns the corresponding piston to its normal position flush with the regulating leak 123, the effect of the rolling thus being corrected. It will be seen that the suspensions could be compounded and duplicated on the same axle.

Claims.

1. In a stabilizing device for vehicles, the combination with a chassis and associated springs mounted outside of said chassis, of rods or supports pivoted in the chassis for attaching said springs thereto, said rods extending inwardly from the sides of the chassis, lever arms carried by the inner ends of said rods, pneumatic suspensions also carried by the chassis each comprising a cylinder and piston, a transverse cross-beam connecting said pistons and means for pivotally securing the inner ends of the aforesaid levers to said cross-beam.

2. In a stabilizing device for vehicles, the combination with a chassis and associated springs mounted outside of said chassis, of rods or supports pivoted in the chassis for attaching said springs thereto, said rods extending inwardly from the sides of the chassis, lever arms carried by the inner ends of said rods, pneumatic suspensions also carried by the chassis, each comprising a cylinder and piston, a chamber adapted to be put in communication with said cylinder and a regulating vent adapted to function only when the aforesaid communications are closed.

3. In a stabilizing device for vehicles, the combination with a chassis and associated springs mounted outside of said chassis, of rods or supports pivoted in the chassis for attaching said springs thereto, said rods extending inwardly from the sides of the chassis, lever arms carried by the inner ends of said rods, pneumatic suspensions also carried by the chassis, each comprising a cylinder and piston, an auxiliary chamber adapted to be put in communication with said cylinder, a passageway in said position to establish this communication dependent upon the movements of said piston and a regulating vent adapted to function only when aforesaid communications are closed.

4. In a stabilizing device for vehicles, the combination with a chassis and associated springs mounted outside of said chassis, of rods or supports pivoted in the chassis for attaching said springs thereto, said rods extending inwardly from the sides of the chassis, lever arms carried by the inner ends of said rods, pneumatic suspensions also carried by the chassis, each comprising a cylinder and piston, an auxiliary chamber arranged outside of the cylinder, and a conduit in said piston adapted to establish communication between said cylinder and auxiliary chamber.

5. In a stabilizing device for vehicles, the combination with a chassis and associated springs mounted outside of said chassis, of rods or supports pivoted in the chassis for attaching said springs thereto, said rods extending inwardly from the sides of the chassis, lever arms carried by the inner ends of said rods, pneumatic suspensions also carried by the chassis each comprising a cylinder and piston, and packing for said piston.

6. In a stabilizing device for vehicles, the combination with a chassis and associated springs mounted outside of said chassis, for rods or supports pivoted in the chassis for attaching said springs thereto, said rods extending inwardly from the sides of the chassis, lever arms carried by the inner ends of said rods, pneumatic suspensions also carried by the chassis, each comprising a cylinder and piston, and obliquely arranged packing for said pistons.

7. In a stabilizing device for vehicles, the combination with a chassis and associated springs mounted outside of said chassis, of rods or supports pivoted in the chassis for attaching said spring thereto, said rods extending inwardly from the sides of the chassis, lever arms carried by the inner ends of said rods, pneumatic suspensions also carried by the chassis, each comprising a cylinder and piston, regulating vents for said pneumatic suspensions and equalizing means for putting the vents of the respective pneumatic suspensions in communication.

8. In a stabilizing device for vehicles, the combination with a chassis and associated springs mounted outside of said chassis, of rods or supports pivoted in the chassis for attaching said springs thereto, said rods extending inwardly from the sides of the chassis, lever arms carried by the inner ends of said rods, pneumatic suspensions also carried by the chassis, each comprising a cylinder and piston, regulating vents for said pneumatic suspensions and means operated by the rolling motion of the vehicle for closing the shock absorbing chamber of the pneumatic suspensions.

In testimony whereof I affix my signature.

HENRI MERCIER.

Witness:
ALEXANDER BOSHER.